(12) United States Patent
Hall

(10) Patent No.: US 12,077,134 B2
(45) Date of Patent: Sep. 3, 2024

(54) WINDSHIELD WIPER BLADE DEVICE

(71) Applicant: Jonathan Hall, New London, CT (US)

(72) Inventor: Jonathan Hall, New London, CT (US)

( * ) Notice: Subject to any disclaimer, the term of this patent is extended or adjusted under 35 U.S.C. 154(b) by 0 days.

(21) Appl. No.: 18/054,287

(22) Filed: Nov. 10, 2022

(65) Prior Publication Data

US 2023/0150454 A1 May 18, 2023

Related U.S. Application Data

(60) Provisional application No. 63/280,677, filed on Nov. 18, 2021.

(51) Int. Cl.
*B60S 1/38* (2006.01)

(52) U.S. Cl.
CPC ......... *B60S 1/38* (2013.01); *B60S 2001/3829* (2013.01); *B60S 2001/3831* (2013.01); *B60S 2001/3836* (2013.01); *B60S 2001/3837* (2013.01)

(58) Field of Classification Search
CPC ...... B60S 2001/3827; B60S 2001/3836; B60S 2001/3837; B60S 2001/3831; B60S 2001/3834; B60S 1/38; B60S 2001/3818
USPC ...................................... 15/250.41
See application file for complete search history.

(56) References Cited

U.S. PATENT DOCUMENTS

| | | | | |
|---|---|---|---|---|
| 2,952,865 A * | 9/1960 | Rohr | ..................... | B60S 1/3801 451/39 |
| 4,177,538 A * | 12/1979 | Blaiklock | ............. | B60S 1/3801 15/250.451 |
| 4,327,457 A * | 5/1982 | Lunsford | .............. | B60S 1/3801 15/250.41 |
| 4,339,839 A * | 7/1982 | Knights | ..................... | B60S 1/38 15/250.04 |
| 4,389,747 A * | 6/1983 | Riester | .................. | B60S 1/3801 15/250.454 |
| 4,567,621 A * | 2/1986 | Alley, Jr. | .............. | B60S 1/3801 15/250.41 |
| 4,649,593 A * | 3/1987 | Gilliam, III | .......... | B60S 1/3801 15/250.41 |
| 5,235,720 A * | 8/1993 | Kinder | ..................... | B60S 1/28 15/250.4 |
| 5,349,718 A * | 9/1994 | Gibbon | ..................... | B60S 1/38 15/245 |
| 5,406,672 A * | 4/1995 | Hipke | ...................... | B60S 1/38 15/250.41 |

(Continued)

*Primary Examiner* — Gary K. Graham
(74) *Attorney, Agent, or Firm* — Brennan, Manna & Diamond, LLC

(57) ABSTRACT

The present invention relates to a windshield wiper blade device primarily comprised of a body further comprised of at least one channel, a first blade insert, a second blade insert, a cleaning attachment that is received by the second blade insert and a wiper attachment mechanism. The first and second blade inserts are generally T-shaped and can each be placed into a T-shaped channel within the body. The first blade insert acts as a traditional windshield wiper blade and the second blade insert comprises a generally cylindrical cleaning attachment. The cleaning attachment is positioned in front of (i.e., closer to the windshield than) the first blade insert, such that the cleaning attachment dislodges any insects or heavy debris on the windshield before the first blade insert cleans precipitation off of a windshield.

20 Claims, 3 Drawing Sheets

(56) References Cited

U.S. PATENT DOCUMENTS

| | | | | |
|---|---|---|---|---|
| 5,778,483 | A * | 7/1998 | Dawson | B60S 1/524 |
| | | | | 15/250.4 |
| 6,505,378 | B1 * | 1/2003 | Squires | B60S 1/3801 |
| | | | | 15/250.4 |
| 7,111,355 | B1 * | 9/2006 | Sorensen | B60S 1/524 |
| | | | | 15/250.4 |
| 7,707,681 | B1 * | 5/2010 | Cabak | B60S 1/38 |
| | | | | 15/250.31 |
| 8,332,990 | B2 * | 12/2012 | Cooper | B60S 1/3874 |
| | | | | 15/250.43 |
| 2008/0163447 | A1 * | 7/2008 | Smith | B60S 1/407 |
| | | | | 15/250.41 |

* cited by examiner

WINDSHIELD WIPER BLADE DEVICE

CROSS-REFERENCE TO RELATED APPLICATION

The present application claims priority to, and the benefit of, U.S. Provisional Application No. 63/280,677, which was filed on Nov. 18, 2021, and is incorporated herein by reference in its entirety.

FIELD OF THE INVENTION

The present invention relates generally to the field of windshield wiper blades. More specifically, the present invention relates to a windshield wiper blade device primarily comprised of a body having at least one channel, a first blade insert, a second blade insert, a cleaning attachment that is received by the second blade insert and a wiper attachment mechanism. The first blade inserts acts as a traditional windshield wiper blade and the second blade insert is further comprised of a generally cylindrical cleaning attachment. The cleaning attachment dislodges any insects or heavy debris on the windshield before the first blade insert cleans precipitation off of a windshield. Accordingly, the present disclosure makes specific reference thereto. Nonetheless, it is to be appreciated that aspects of the present invention are also equally applicable to other like applications, devices and methods of manufacture.

BACKGROUND

Generally, every vehicle is equipped with windshield wiper blades, wherein said blades function to clear precipitation, such as rain, snow, sleet and hail from the windshield of the vehicle. Existing windshield wiper blades typically only feature a single blade, that is used to clear precipitation from a windshield. However, while driving it is not uncommon for insects to impact onto the windshield of a vehicle, such that they become stuck to the windshield. Existing wiper blades are ineffective at removing stuck insects, and often simply smear the insect further across the windshield instead. As a result, a user must exit the vehicle and manually clean off any insects with a tool or other object. This is undesirable, as it is unnecessary and inefficient. In addition, a driver may not have time to exit the vehicle to clean said insects. Furthermore, dirt and other hard-to-clean debris may become stuck on a windshield during driving, wherein said dirt and debris can also not be easily removed by a conventional windshield wiper blade.

Therefore, there exists a long-felt need in the art for an improved windshield wiper blade. There also exists a long-felt need in the art for a windshield wiper blade device that easily cleans insects and other dirt and debris from the surface of a vehicle windshield. In addition, there exists a long-felt need in the art for a windshield wiper blade device that easily cleans insects and other dirt and debris from the surface of a vehicle windshield, but does not require a user to exit the vehicle to do so.

The subject matter disclosed and claimed herein, in one embodiment thereof, comprises a windshield wiper blade device. The device is primarily comprised of a body further comprised of at least one channel, a first blade insert, a second blade insert, a cleaning attachment that is received by the second blade insert and a wiper attachment mechanism. The first and second blade inserts are generally T-shaped and can each be placed into a T-shaped channel within the body. The first blade inserts acts as a traditional windshield wiper blade and the second blade insert is further comprised of a generally cylindrical cleaning attachment. The cleaning attachment is positioned in front of (i.e., closer to the windshield than) the first blade insert, such that the cleaning attachment dislodges any insects or heavy debris on the windshield before the first blade insert cleans precipitation off of a windshield.

In this manner, the windshield wiper blade device of the present invention accomplishes all of the forgoing objectives and provides an improved windshield wiper blade. Further, the device easily cleans insects and other dirt and debris from the surface of a vehicle windshield. In addition, the device does so without requiring that a user exit the vehicle to clean said insects, dirt, and debris from their windshield.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a windshield wiper blade device. The device is primarily comprised of a body further comprised of at least one channel, a first blade insert, a second blade insert, a cleaning attachment that is received by the second blade insert and a wiper attachment mechanism. The body and the first and second blade inserts are preferably manufactured from a rigid or semi-rigid plastic or rubber material. The body and inserts may further be any color known in the art and may be comprised of a plurality of indicia such as, but not limited to, patterns, logos, emblems, images, symbols, designs, letters, numbers, words, characters, animals, advertisements, brands, etc.

The body is preferably generally hexagonal in shape with a top surface that is preferably flat, a bottom surface that is preferably flat, two preferably flat ends, two generally parallel and flat side surfaces and two angled side surfaces which preferably form an acute angle in relation to the flat side surfaces and bottom surface. The flat side surfaces and/or the angled side surfaces may further be comprised of at least one channel to facilitate the attachment of a wiper attachment mechanism. Each flat end and the bottom surface of the body is further comprised of at least one, but preferably two, generally T-shaped channels that run from one end to the other end through the body of the device. The bottom of the channel further exits the bottom surface of the body.

The first blade insert and the second blade insert are generally T-shaped and are comprised of a horizontal member and a vertical member. The second blade insert is further comprised of a cleaning attachment that may be fixedly or removably attached to the vertical member of the insert. The attachment is preferably cylindrical in shape, and is comprised of a channel that runs through the top surface and side surface of the attachment, such that the vertical member can be placed into the channel to secure the second blade insert into the cleaning attachment.

The first blade insert and the second blade insert are preferably placed into the channels of the body by sliding each insert into the channels from one end of the body to the other end. In the preferred embodiment, the second insert with attached cleaning attachment is placed in the channel that is closer to the windshield of the vehicle the device is attached to (i.e., in front of the first blade insert), such that the cleaning attachment of the second blade insert will scrape, clean or wipe away any insects or debris on the windshield of a vehicle before the first blade insert. The first blade insert then functions as a traditional windshield wiper, and cleans any precipitation or small debris from the windshield after the second blade insert has cleaned the insects and/or debris.

Accordingly, the windshield wiper blade device of the present invention is particularly advantageous as it provides an improved windshield wiper blade that easily cleans insects and other dirt and debris from the surface of a vehicle windshield. In addition, the device does not require that a user exit the vehicle. In this manner, the windshield wiper blade device overcomes the limitations of existing windshield wiper blades known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
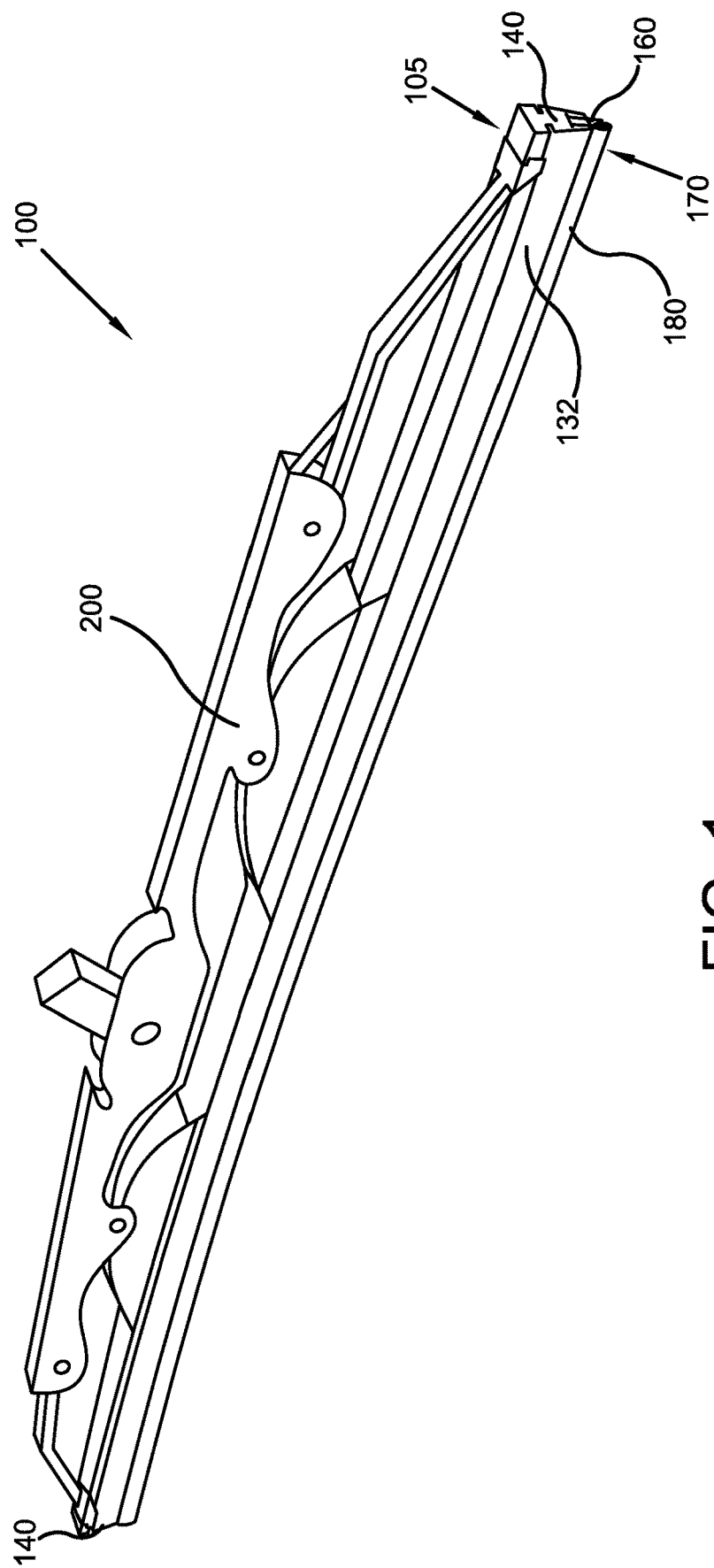
FIG. 1 illustrates a perspective view of one embodiment of the windshield wiper blade device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As stated supra, there is a long-felt need in the art for an improved windshield wiper blade. There also exists a long-felt need in the art for a windshield wiper blade device that easily cleans insects and other dirt and debris from the surface of a vehicle windshield. In addition, there exists a long-felt need in the art for a windshield wiper blade device that easily cleans insects and other dirt and debris from the surface of a vehicle windshield but does not require that a user exits the vehicle to do so.

The present invention, in one exemplary embodiment, is a windshield wiper blade device primarily comprised of a body having at least one channel, a first blade insert, a second blade insert, a cleaning attachment that is received by the second blade insert and a wiper attachment mechanism. The body and the first and the second blade inserts are preferably manufactured from a rigid or semi-rigid plastic or rubber material and may further be any color known in the art. The body and inserts may also be comprised of a plurality of indicia such as, but not limited to, patterns, logos, emblems, images, symbols, designs, letters, numbers, words, characters, animals, advertisements, brands, etc.

The body is preferably generally hexagonal in shape with a top surface that is preferably flat, a bottom surface that is preferably flat, two preferably flat ends, two generally parallel and flat side surfaces and two angled side surfaces which preferably form an acute angle in relation to the flat side surfaces and bottom surface. The flat side surfaces and/or the angled side surfaces may further be comprised of at least one channel to facilitate the attachment of a wiper attachment mechanism. Each flat end and the bottom surface of the body is also comprised of at least one, but preferably two, generally T-shaped channels that run from one end to the other end through the body. The bottom of the channel further exits the bottom surface of the body.

Both the first and second blade inserts are generally T-shaped and are comprised of a horizontal member and a vertical member. The second blade insert is further comprised of a cleaning attachment that may be fixedly or removably attached to the vertical member of the insert, wherein the attachment is preferably cylindrical in shape and is comprised of a channel that runs through the top surface and side surface of the attachment, such that the vertical member can be placed into the channel to secure the second blade insert into the cleaning attachment.

Both inserts are preferably placed into the channels of the body by sliding each insert into the channels from one end of the body to the other end. In the preferred embodiment, the second insert with attached cleaning attachment is placed in the channel that is closer to the windshield of the vehicle the device is attached to (i.e., in front of the first blade insert), such that the cleaning attachment of the second blade insert will scrape, clean, or wipe away any insects or debris on the windshield of a vehicle before the first blade insert. The first blade insert functions as a traditional windshield wiper, and cleans any precipitation or small debris from the windshield.

Accordingly, the windshield wiper blade device of the present invention is particularly advantageous as it provides an improved windshield wiper blade that easily cleans insects and other dirt and debris from the surface of a vehicle windshield. In addition, the device does not require that a user exit the vehicle. In this manner, the windshield wiper blade device overcomes the limitations of existing windshield wiper blades known in the art.

Referring initially to the drawings, FIG. 1 illustrates a perspective view of one embodiment of the windshield wiper blade device 100 of the present invention. The device 100 is primarily comprised of a body 105 further comprised of at least one channel 150 (shown in FIG. 3), a first blade insert 160, a second blade insert 170, a cleaning attachment 180 that is received by the second blade insert 170 and a wiper attachment mechanism 200. It should be appreciated that the present invention relates to a novel windshield wiper blade, and not a novel means of attaching a windshield wiper blade to the windshield of a vehicle. In this manner, it should be known that the wiper attachment mechanism 200 of the device 100 may be any common structure or architecture that allows a wiper blade to attach to a vehicle or any structure of a vehicle that receives a windshield wiper blade as is known in the art.

The body 105 and the first and the second blade inserts 160, 170 are preferably manufactured from a rigid or semi-rigid plastic material such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, recycled plastic, biodegradable plastic, etc. or a rigid or semi-rigid rubber material such as, but not limited to: neoprene, silicone, nitrile, EPDM, Styrene-Butadiene, Butyl, natural, fluorosilicone, etc., or any other suitable material as is known in the art. The body 105 and inserts 160, 170 may further be any suitable color known in the art, and may be comprised of a plurality of indicia 190 (shown in FIG. 3) such as, but not limited to, patterns, logos, emblems, images, symbols, designs, letters, numbers, words, characters, animals, advertisements, brands, etc., or any other suitable indicia as is known in the art.

Figure 2:
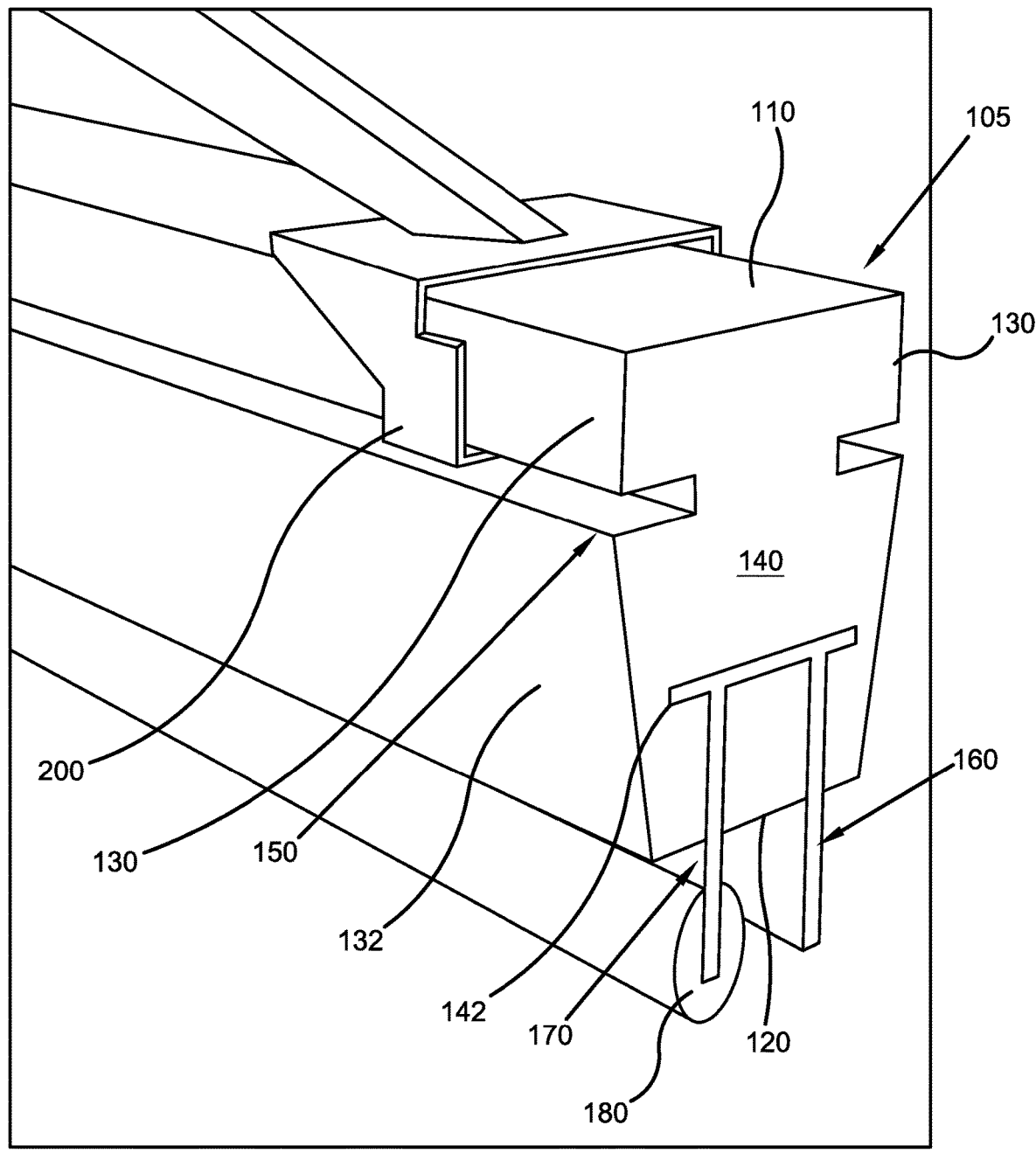
FIG. 2 illustrates an enhanced perspective view of one embodiment of the windshield wiper blade device of the present invention in accordance with the disclosed architecture.

FIG. 2 illustrates an enhanced perspective view of one embodiment of the windshield wiper blade device 100 of the present invention. The body 105 of the device 100 is preferably generally hexagonal in shape but may be any suitable shape as is known in the art including, but not limited to, square, rectangular, oval, oblong, triangular, etc., that allow the body 105 to contact and clean a vehicle windshield. The body 105 further comprises a top surface 110 that is preferably flat, a bottom surface 120 that is preferably flat, two preferably flat ends 140, two generally parallel and flat side surfaces 130, and two angled side surfaces 132, which preferably form an acute angle in relation to the flat side surfaces 130 and bottom surface 120. The flat side surfaces 130 and/or the angled side surfaces 132 may further be comprised of at least one channel 150, that may be square or rounded to facilitate the attachment of a wiper attachment mechanism 200. The wiper attachment mechanism 200 can be in the form of a grooved clip or other suitable structure that allows the body 105 to be secured to the mechanism 200, such that the entire device 100 can be attached to a vehicle windshield.

Furthermore, each end 140 and the bottom surface 120 of the body 105 is further comprised of at least one, but preferably two generally T-shaped channels 142. The T-shaped channels 142 run from one end 140 to the other end 140 through the body 105. The bottom of the T-shaped channel 142 further exits the bottom surface 120 of the body 105. The first blade insert 160 and the second blade insert 170 are preferably placed into the T-shaped channels 142 of the body 105. This can be accomplished by sliding each insert 160, 170 into the T-shaped channels 142 from one end 140 of the body 105. In the preferred embodiment, the second insert 170 with the attached cleaning attachment 180 is placed in the T-shaped channel 142 that is closer to the windshield of the vehicle the device 100 is attached to (i.e., in front of the first blade insert 160). In this manner, the cleaning attachment 180 of the second blade insert 170 will scrape, clean, or wipe away any insects or debris on the windshield of a vehicle before the first blade insert 160. The first blade insert 160 then functions as a traditional windshield wiper and cleans any precipitation or small debris from the windshield. However, in a differing embodiment the first blade insert 160 and the second blade insert 170 can be placed in an opposite arrangement within the T-shaped channels 142, depending on the needs and/or wants of a user. It should also be noted that because the inserts 160, 170 are removable, they can be easily replaced as needed.

Figure 3:
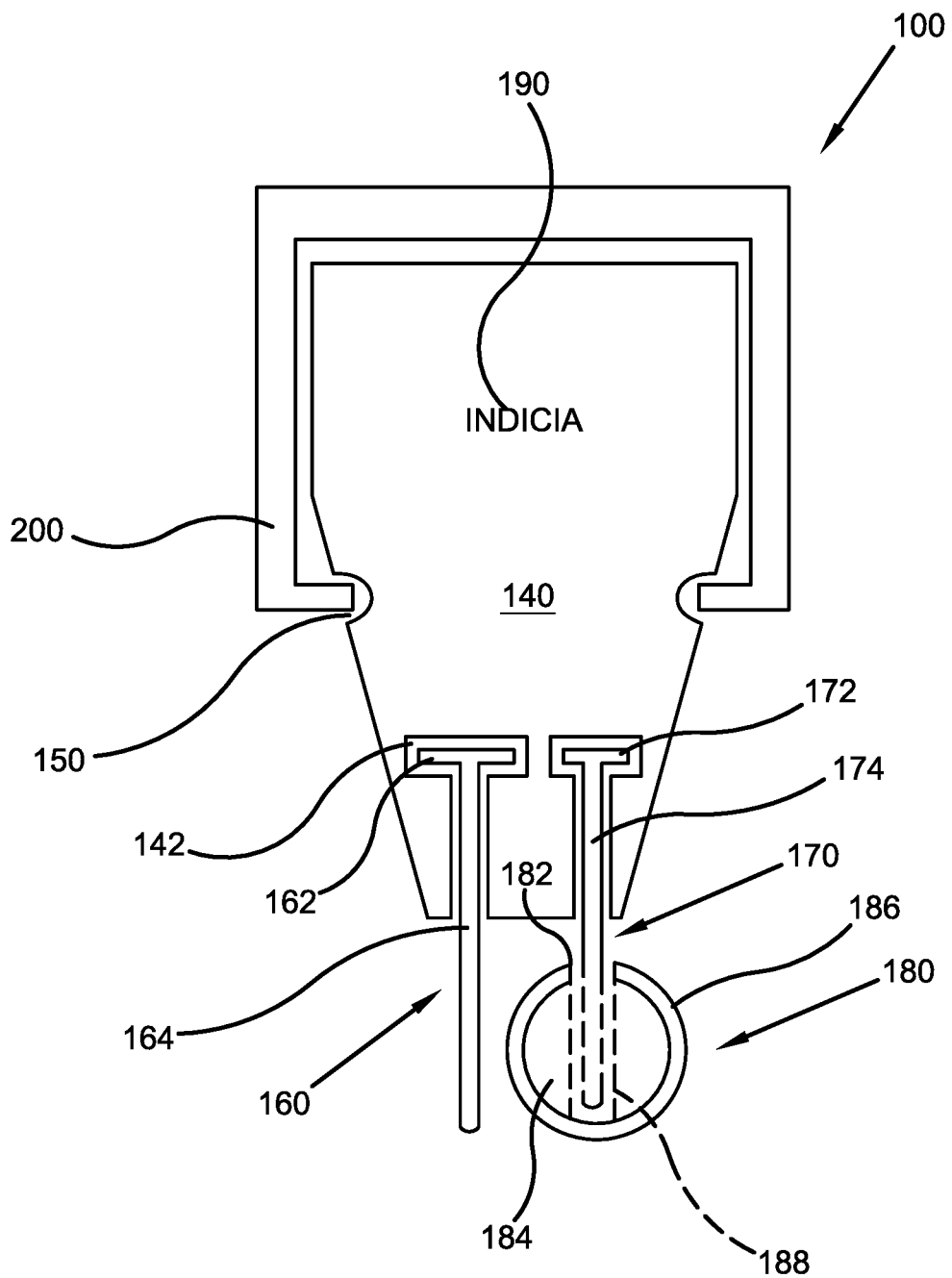
FIG. 3 illustrates a side view of one embodiment of the windshield wiper blade device of the present invention disclosing the indicia in accordance with the disclosed architecture.

FIG. 3 illustrates a side view of one embodiment of the windshield wiper blade device 100 of the present invention. The device 100 is comprised of a first blade insert 160 and a second blade insert 170. The first blade insert 160 is generally T-shaped and is comprised of a horizontal member 162 and a vertical member 164. In differing embodiments, the horizontal member 162 and vertical member 164 may be fixedly or removably attached to one another. The second blade insert 170 is also generally T-shaped and is comprised of a horizontal member 172 and a vertical member 174. In differing embodiments, the horizontal member 172 and vertical member 174 may be fixedly or removably attached to one another. However, the second blade insert 170 is further comprised of a cleaning attachment 180 that may be fixedly or removably attached to the vertical member 174 of the insert 170. The attachment 180 is preferably cylindrical in shape, and is comprised of a channel 188 that runs through the top surface 182 and side surface 184 of the attachment 180, such that the vertical member 174 can be placed into the channel 188 to secure the second blade insert 170 into the cleaning attachment 180.

The attachment 180 is preferably manufactured from a suitable foam material as is known in the art. However, the insert 180 may further be manufactured from a suitable plastic or rubber material as well. In addition, the outer surface 186 of the attachment 180 may have a fabric coating or fabric outer surface. In the preferred embodiment, the coating is nylon but may be any suitable fabric known in the art such as, but not limited to, a vinyl, canvas, cashmere, chenille, chiffon, cotton, damask, jersey, lace, linen, wool, modal, polyester, satin, silk, spandex, suede, tweed, twill, velvet, acrylic, modacrylic, nylon, polypropylene, polyurethane, polyvinyl chloride, polyethylene, vinylidene, benzoate, aramid, rayon, acetate, triacetate, etc. Further, the fabric coating may be waterproof depending on the wants and/or needs of a user.

However, it should be appreciated that the attachment 180 may be any other suitable shape as is known in the art such as, but not limited to, square, rectangular, triangular, hexagonal, octagonal, etc., that allows the attachment 180 to contact and clean a vehicle windshield. In addition, the attachment 180 may be hollow or solid in differing embodiments to save or gain weight in order to help the attachment 180 more easily clean a windshield.

The first blade insert 160 and second blade insert 170 are preferably placed into the T-shaped channels 142 of the body 105. This can be accomplished by sliding each insert 160, 170 into the T-shaped channels 142 from one end 140 of the body 105. In the preferred embodiment, the second insert 170 with the attached cleaning attachment 180 is placed in the T-shaped channel 142 that is closer to the windshield of the vehicle the device 100 is attached to (i.e., in front of the first blade insert 160). In this manner, the cleaning attachment 180 of the second blade insert 170 will scrape, clean or wipe away any insects or debris on the windshield of a vehicle before the first blade insert 160. The first blade insert 160 then functions as a traditional windshield wiper and cleans any precipitation or small debris from the windshield. However, in differing embodiments the first blade insert 160 and the second blade insert 170 can be placed in an opposite arrangement within the T-shaped channels 142. It should also be noted that because the inserts 160, 170 are removable, they can be easily replaced as needed.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "windshield wiper blade device" and "device" are interchangeable and refer to the windshield wiper blade device 100 of the present invention.

Notwithstanding the forgoing, the windshield wiper blade device 100 of the present invention and its various components can be of any suitable size and configuration as is known in the art without affecting the overall concept of the invention, provided that they accomplish the above-stated objectives. One of ordinary skill in the art will appreciate that the size, configuration and material of the windshield wiper blade device 100 as shown in FIGS. 1-3 is for illustrative purposes only, and that many other sizes and shapes of the windshield wiper blade device 100 are well within the scope of the present disclosure. Although the dimensions of the windshield wiper blade device 100 are important design parameters for user convenience, the windshield wiper blade device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A windshield wiper blade device comprising:
   a body portion comprised of a top surface, a bottom surface, a pair of vertical side surfaces, a pair of angled side surfaces each extending between one of the vertical side surfaces and the bottom surface, an end, and a rounded channel configured to engage a wiper attachment mechanism;
   a first blade insert comprising a horizontal member and a vertical member removably detachable from the horizontal member;
   a second blade insert comprising a horizontal member and a vertical member removably detachable from the horizontal member;
   a cleaning attachment; and
   a wiper attachment mechanism; and
   wherein the body portion further comprises at least one indicia.

2. The windshield wiper blade device of claim 1, wherein the cleaning attachment attaches to the second blade insert.

3. The windshield wiper blade device of claim 2, wherein the cleaning attachment is cylindrical in shape.

4. The windshield wiper blade device of claim 1, wherein the first blade insert and the second blade insert attach to the body portion.

5. A windshield wiper blade device comprising:
   a body comprised of a top surface, a bottom surface, a pair of vertical side surfaces each terminating in a rounded channel, a pair of angled side surfaces each extending between the channel of the respective vertical side surface and the bottom surface at an acute angle with respect to the respective vertical side surface, and an end comprised of a T-shaped channel;
   a first blade insert;
   a second blade insert;
   a cleaning attachment that attaches to the second blade insert; and
   a wiper attachment mechanism; and
   wherein the body portion further comprises at least one indicia; and
   wherein at least one of the first and second blade inserts comprises a blade insert indicia; and
   wherein the cleaning attachment comprises a channel running through an entire top surface and both ends of the cleaning attachment.

6. The windshield wiper blade device of claim 5, wherein the cleaning attachment is cylindrical in shape.

7. The windshield wiper blade device of claim 6, wherein the cleaning attachment is manufactured from a foam material.

8. The windshield wiper blade device of claim 6, wherein the cleaning attachment is comprised of a fabric outer surface.

9. The windshield wiper blade device of claim 5, wherein the first blade insert and the second blade insert attach to the body via the T-shaped channel.

10. The windshield wiper blade device of claim 9, wherein each of the first blade insert and the second blade insert are T-shaped.

11. The windshield wiper blade device of claim 5, wherein the wiper attachment mechanism attaches to the channel of the side surface.

12. The windshield wiper blade device of claim 5, wherein the T-shaped channel spans a length of the body.

13. A windshield wiper blade device comprising:
   a body comprised of a horizontal top surface, a horizontal bottom surface, a pair of vertical side surfaces each extending from the horizontal top surface and terminating in a rounded channel, a pair of angled side surfaces each extending between the channel of the respective vertical side surface and the bottom surface at an acute angle with respect to both the respective vertical side surface and the horizontal bottom surface, and an end having a T-shaped channel;
   a first blade insert having a horizontal member and a vertical member removably attached to the horizontal member, wherein the first blade insert can be inserted into the T-shaped channel of the end of the body;

a second blade insert having a horizontal member and a vertical member removably attached to the horizontal member, wherein the second blade insert can be inserted into the T-shaped channel of the end of the body;
a cleaning attachment that attaches to the vertical member of the second blade insert; and
a wiper attachment mechanism; and
wherein the body further comprises at least one indicia; and
wherein the body is a biodegradable plastic body.

14. The windshield wiper blade device of claim 13, wherein the first blade insert and the second blade insert are T-shaped.

15. The windshield wiper blade device of claim 13, wherein the cleaning attachment is cylindrical in shape.

16. The windshield wiper blade device of claim 15, wherein the cleaning attachment is manufactured from a foam material.

17. The windshield wiper blade device of claim 15, wherein the cleaning attachment is comprised of a fabric outer surface.

18. The windshield wiper blade device of claim 13, wherein the wiper attachment mechanism attaches to the channel of the side surface.

19. The windshield wiper blade device of claim 13, wherein the T-shaped channel spans a length of the body.

20. The windshield wiper blade device of claim 13, wherein the cleaning attachment removably attaches to the vertical member of the second blade insert.

* * * * *